United States Patent
Chen et al.

(10) Patent No.: US 8,594,221 B2
(45) Date of Patent: Nov. 26, 2013

(54) MODEL-BASED CHANNEL ESTIMATOR FOR CORRELATED FADING CHANNELS AND CHANNEL ESTIMATION METHOD THEREOF

(75) Inventors: Yen-Chih Chen, Hsinchu (TW); Chien-Chun Cheng, Taipei (TW); Yu-Ted Su, Hsinchu (TW)

(73) Assignees: Industrial Technology Research Institute, Hsinchu (TW); National Chiao Tung University, HsinChu (TW)

( * ) Notice: Subject to any disclaimer, the term of this patent is extended or adjusted under 35 U.S.C. 154(b) by 331 days.

(21) Appl. No.: 13/115,093

(22) Filed: May 24, 2011

(65) Prior Publication Data

US 2012/0300867 A1    Nov. 29, 2012

(51) Int. Cl.
  *H04B 7/02*    (2006.01)
  *H04L 1/02*    (2006.01)

(52) U.S. Cl.
  USPC .......................................... 375/267; 375/347

(58) Field of Classification Search
  USPC .................. 375/260, 267, 299, 347
  See application file for complete search history.

(56) References Cited

U.S. PATENT DOCUMENTS

| | | | |
|---|---|---|---|
| 6,907,270 B1 | 6/2005 | Blanz | |
| 7,065,371 B1 | 6/2006 | Kleinerman | |
| 7,310,304 B2 | 12/2007 | Mody et al. | |
| 7,680,266 B2 | 3/2010 | Caiado de Lamare et al. | |
| 8,260,208 B2 * | 9/2012 | Auer | 455/67.11 |
| 8,432,993 B2 * | 4/2013 | Zangi et al. | 375/267 |
| 2010/0074358 A1 | 3/2010 | Khojastepour et al. | |
| 2010/0091906 A1 * | 4/2010 | Raleigh et al. | 375/299 |

OTHER PUBLICATIONS

C.-C. Cheng, Y.-C, Chen and Y. T. Su, "Modelling and Estimation of Correlated MIMO-OFDM Fading Channels", in proc. IEEE ICC, 2011.

* cited by examiner

*Primary Examiner* — David B. Lugo

(57) ABSTRACT

A model-based channel estimator for correlated fading channels adapted to a multiple-input multiple-output (MIMO) system, estimates a coefficient vector of a channel matrix for a given angle of departure (AoD) according to a plurality of received signals, a plurality of transmit pilots, a plurality of known model orders, and a plurality of predetermined bases for exploiting time, frequency, spatial channel correlation among a transmit antenna array, and spatial channel correlation among a receive antenna array, then estimates a mean AoD based on the estimated channel matrix. The channel estimator estimates iteratively the coefficient vector and the mean AoD until a stop criterion is met. Then, it reconstructs a channel estimate by using the plurality of predetermined bases, the coefficient vector, and the mean AoD.

18 Claims, 12 Drawing Sheets

MODEL-BASED CHANNEL ESTIMATOR FOR CORRELATED FADING CHANNELS AND CHANNEL ESTIMATION METHOD THEREOF

TECHNICAL FIELD

The disclosure generally relates to a model-based channel estimator for correlated fading channels and the channel estimation method thereof.

BACKGROUND

Increasing demand for higher wireless system capacity has catalyzed several ground-breaking transmission techniques. In wireless communication systems, recent developments have been made using orthogonal frequency division multiplexing (OFDM) technologies. In OFDM schemes, the subcarrier frequencies are spaced apart by precise frequency differences and make efficient use of the spectrum by allowing overlap. Besides, channel equalization becomes simpler than by using adaptive equalization techniques with single-carrier systems. By using multiple-input multiple-output (MIMO) schemes in OFDM systems, it is possible to increase the capacity of data. The MIMO technology has attracted the great part of recent attention. FIG. 1 is an exemplary diagram illustrating a typical MIMO system having M transmit antennas and N received antennas at k-th sub-carrier. As shown in FIG. 1, both transmit and receive sides have multiple antennas. Transmit data X is transmitted through M×N wireless channels H then received by a receiver's multiple antennas as observation data Y.

It has been shown that significant capacity gains are achievable when multi-element antennas (MEA) are used at both the transmitting and receiving sides. Spatial multiplexing techniques, for example the BLAST (Bell-labs Layered Space-Time) system, were developed to attain very high spectral efficiencies in rich scattering environments. Ideal rich-scattering environments may decorrelate channels between different pairs of transmit and receive antennas.

In practice, however, spatial correlations do exist and should be considered when designing a MIMO receiver for evaluating the corresponding system performance. Spatial correlation depends on physical parameters such as antenna spacing, antenna arrangement, and scatters' distributions. Antenna correlations reduce the number of equivalent orthogonal sub-channels, decrease spectral efficiency, making it more difficult to detect the transmitted data. A coherent MIMO receiver requires an accurate channel estimate to perform critical operations and provide satisfactory performance. Not only is reliable channel estimation mandatory in guaranteeing signal reception quality but it is also needed in designing an adequate precoder at the transmitting side to achieve maximum throughput or minimum bit error rate in feedback MIMO systems.

Various pilot-assisted MIMO channel estimators have been disclosed. For example, one disclosed method exploits the sparsity structure of MIMO channels. A channel estimation process or a pilot placement and pilot allocation process can be taken for the sparse channel estimation of MIMO inter-symbol interference (ISI) channels in MIMO-OFDM systems. The front or back end of a channel estimator may utilize the channel estimation output by the scheme. In the scheme, there is no fixed basis for precoder at the transmitter end or for codebook selector at the receiver end.

Another document disclosed estimating channel parameters in MIMO systems. Referring to FIG. 2, one embodiment performed by the channel parameter estimator includes calculating coarse channel estimates using an least square (LS) method and/or a Zero forcing method (step 202), performing a frequency domain interpolation procedure (step 204) to the subcarriers that were not excited, and reducing the mean square error (step 206). In addition to the estimation of channel parameters, the parameter estimator may further calculate estimates of the "noise variance," which is a parameter representing the power of the extraneous unwanted noise present in the signal. An exemplary embodiment for noise variance estimation includes calculating a noise term from coarse and final channel estimates (step 212), multiplying the noise term with a signal transmission matrix for each tone (step 214), and converting the frequency domain coefficients to the time domain (step 216), and calculating noise variance estimate for each receive antenna (step 218). There is also no fixed basis for precoder at the transmitter end or for codebook selector at the receiver end. While only one frequency basis is used for the channel estimator.

Yet another document disclosed a technology for reduced rank channel estimation in a communication system. Referring to FIG. 3, the technology exploits redundant and/or a priori knowledge within a system to simplify the estimation calculation including estimating significant delays of the channel (step 310), producing full dimension channel estimates (step 312), and calculating a covariance matrix of channels (step 314). The covariance matrix is further analyzed to determine if the channel parameters may be reduced for channel estimation. If not, use the full rank of the system to model the channel (step 320), otherwise a reduced rank matrix is used for the calculation including estimating the channel subspace (step 322) and reduced rank channel parameters (step 324), and transforming channel parameters back to full dimension (step 326). There is also no fixed basis for precoder at the transmitter end or for codebook selector at the receiver end. While spatial basis is provided in real time for the channel estimation.

In conventional designs, closed-loop MIMO systems provide high capacity and robust performance when accurate channel state information (CSI) is available (often through feedback). Codebook-based solutions are used to reduce the CSI bandwidth requirement. Few estimators are specifically designed for correlated MIMO channels, and those few exploited only channel's time and frequency correlation characteristics by approximating the time- and/or frequency-domain response by an analytic model. In fact, no method or apparatus exists for MIMO system that is capable of using spatial, frequency and time correlation as well. Thus a need exists for a method and apparatus that is capable of using time/frequency/spatial correlation and may further provide accurate estimates, compact and useful CSI, and potential post processing complexity cutbacks.

SUMMARY

The exemplary embodiments of the present disclosure may provide a model-based channel estimator for correlated fading channels and channel estimation method thereof.

A disclosed embodiment relates to a model-based channel estimator for correlated fading channels adapted to a MIMO system having a transmit antenna array and a receive antenna array. The model-based channel estimator comprises an estimator of channel parameters and an estimate reconstruction unit. The estimator of channel parameters estimates a coefficient vector of a channel matrix for a given angle of departure (AoD) according to a plurality of received signals, a plurality of transmit pilots, a plurality of known model orders, and a plurality of predetermined bases for exploiting time, frequency, spatial channel correlation among the transmit antenna array, and spatial channel correlation among the receive antenna array, then estimates a mean AoD based on the estimated channel matrix. The estimator of channel parameters estimates iteratively said coefficient vector and said mean AoD until a stop criterion is met. The estimate reconstruction unit reconstructs a channel estimate by using the plurality of predetermined bases, the coefficient vector, and the mean AoD.

Another disclosed embodiment relates to a model-based channel estimation method for correlated fading channels adapted to a MIMO system having a transmit antenna array and a receive antenna array. The model-based channel estimation method comprises: determining a plurality of model orders denoted by $K_L$, $K_F$, $K_T$, $K_R$, for a derived channel model by an estimation algorithm; performing an estimation for a coefficient vector $C_{coef}$ of a channel matrix and an estimation for an angle of departure (AoD) by using an iterative scheme, and stopping iterations when a criterion being satisfied; and reconstructing a full dimension channel estimate $H_L$ by using the estimated channel coefficient vector $C_{coef}$, a plurality of predetermined basis matrices denoted by $Q_{L,K_L}$, $Q_{F,K_F}$, $Q_{R,K_R}$, and $\tilde{Q}_{T,K_T}$ containing both basis matrix $Q_{T,K_T}$ and the AoD; wherein the derived channel model is derived by predetermining the plurality of basis matrices $Q_{L,K_L}$, $Q_{F,K_F}$, $Q_{T,K_T}$ and $Q_{R,K_R}$ for exploiting time channel correlation, frequency channel correlation, spatial channel correlation among the transmit antenna array, and spatial channel correlation among the receive antenna array, respectively.

Yet another disclosed embodiment relates to a receiver end having a codebook selector. The receiver end is adapted to a multiple-input multiple-output (MIMO) system having a transmit antenna array and a receive antenna array. The receiver end comprises a model order estimator and a model-based channel estimator. The model order estimator estimates a plurality of model orders. The model-based channel estimator estimates a coefficient vector of a channel matrix for a given angle of departure (AoD) according to a plurality of received signals, a plurality of transmit pilots, the plurality of model orders for a derived channel model, and a plurality of predetermined bases for exploiting time channel correlation, frequency channel correlation, spatial channel correlation among the transmit antenna array, and spatial channel correlation among the receive antenna array, then estimates a mean AoD based on the estimated channel matrix, wherein, the estimator of channel parameters estimates iteratively the coefficient vector and the mean AoD until a stop criterion is met. When the stop criterion is met, the model-based channel estimator reconstructs a channel estimate by using the plurality of predetermined bases, the coefficient vector, and the mean AoD.

The foregoing and other features, aspects and advantages of the present invention will become better understood from a careful reading of a detailed description provided herein below with appropriate reference to the accompanying drawings.

DETAILED DESCRIPTION OF THE EXEMPLARY EMBODIMENTS

Figure 1:
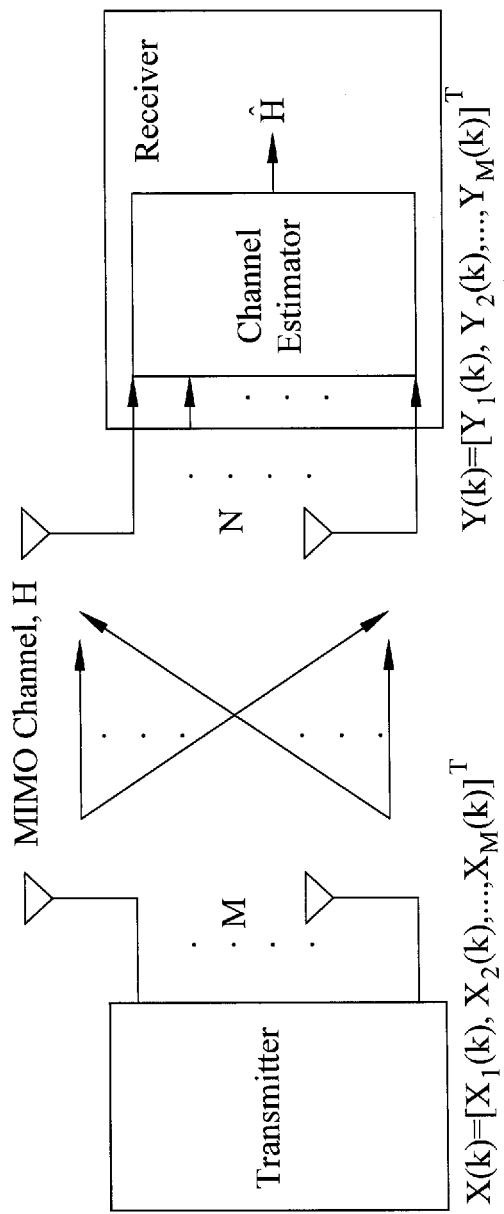
FIG. 1 is an exemplary diagram illustrating a typical MIMO system.
Figure 2:
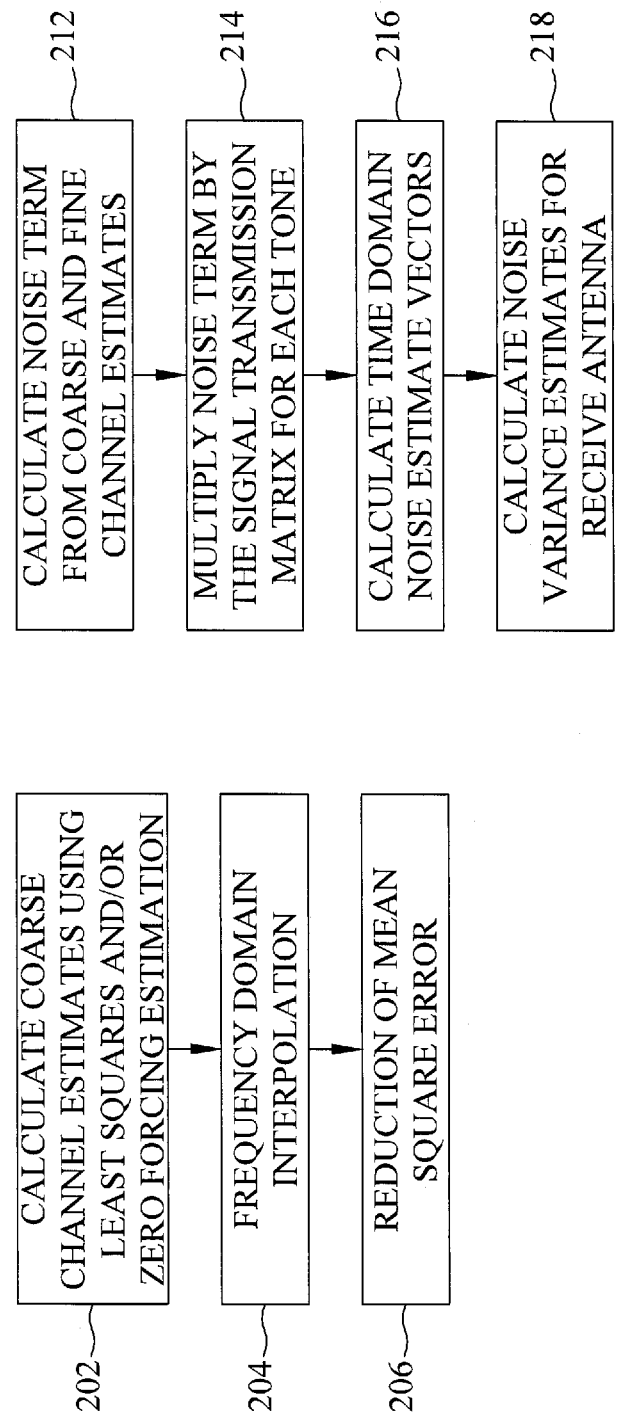
FIG. 2 shows an exemplary schematic view of sparse channel estimation for MIMO OFDM systems.
Figure 3:
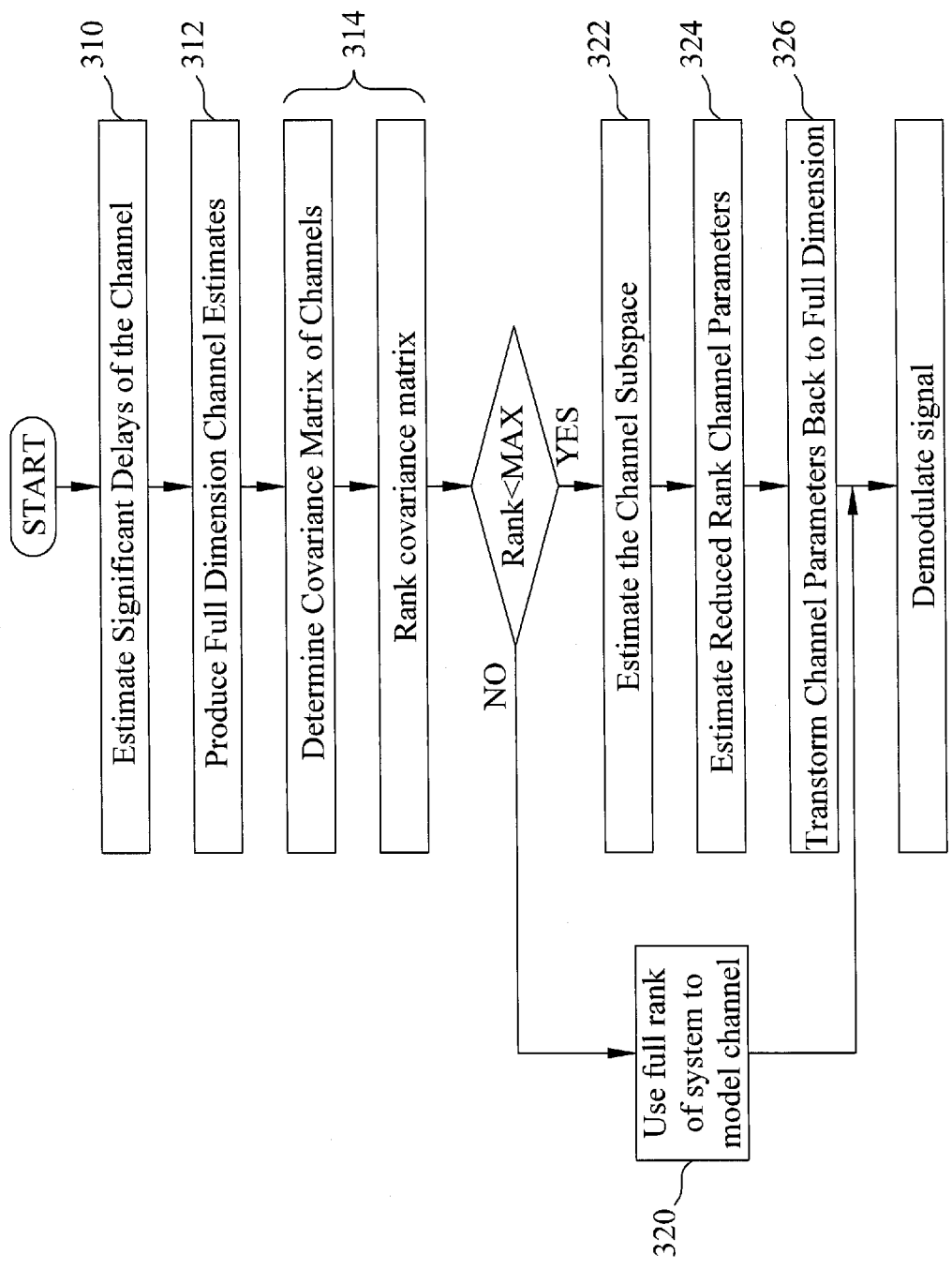
FIG. 3 shows a schematic view of a technology for reduced rank channel estimation in a communication system.

In OFDM systems with MIMO, represented by MIMO-OFDM systems, full-rank codebook may be not needed most of the time, especially if one considers all degrees of freedom. Efficient codebook design may be accomplished by taking the spatial, time and frequency correlations into account. In addition, pre-determined basis may be used to reduce computation. The exemplary embodiments provide a model-based channel estimator for correlated fading channels. Estimates of channel parameters may include channel coefficients and mean angle of departure (AoD) estimates, and exploit the structure of channel response such as time, frequency, and spatial correlations.

The pilot-assisted channel schemes of the exemplary embodiments are on the basis of a new general MIMO channel representation which does not require information of second-order channel statistics. Spatial and time covariance (or correlation) functions are described by non-parametric regression and the influence of the mean AoD is related to other channel parameters via a regression model. This representation admits a reduced-rank channel model and compact CSI representation, making possible reduced feedback channel bandwidth requirement. It may result in separable descriptions of channel correlations and mean AoD for correlated MIMO systems. Therefore efficient schemes to identify the realistic channel response can be developed. In other words, the exemplary embodiments are developed to provide higher CSI resolution, offer enhanced estimator performance in most cases, and simplify post-channel-estimation signal processing.

After a review of the typical space-time antenna setup and a general received MIMO signal model, a new channel model for a plurality of spatial-correlated block-faded MIMO channels is derived as follows. For example, in a system model with continue-type pilot, consider a K sub-carrier MIMO-OFDM system with linear arrays of M transmit and N receive antennas (N≤M), respectively. Independent data streams are transmitted from the base station (BS).

$$X_n(k)=[x_1(k),x_2(k),\ldots,x_M(k)]^T$$

where
$x_i(k)$ is the transmit signal from the i-th transmit antenna.
k is the sub-carrier index.
n is the time index.
M is the total number of transmit antennas.
$[\ ]^T$ denotes the matrix transpose operation.

At the receiver, after cyclic prefix (CP) removal, each data block is converted into the frequency domain using a K-point discrete Fourier transform (DFT) yielding $$Y^n(k)=[y_1(k),y_2(k),\ldots,y_N(k)]^T$$

where
$y_j(k)$ is the received signal by the j-th receive antenna on k-th sub-carrier at time nT.

The cyclic prefix (CP) length is assumed to be equal to or larger than the channel impulse response. Therefore, the receive signals at the k-th sub-carrier may be written as $$Y_n(k)=H_n(k)X_n(k)+\gamma_n(k)$$

where
$Y_n(k)$ is the N×1 receive vector on the k-th sub-carrier at time nT.
$X_n(k)$ is the M×1 transmit vector on the k-th sub-carrier at time nT.
$\gamma_n(k)$ is a M×1 zero mean additive white Gaussian noise (AWGN) vector.
$H_n(k)$ is the N×M frequency domain channel response matrix.

Arrange the received signals at all sub-carriers into a matrix, the stacked received vector from sub-carrier 0-th to (K−1)-th may be expressed as $$Y_n^K = [Y_n(0), Y_n(1), \ldots, Y_n(K-1)]$$

$$X_n^K = \begin{bmatrix} X_n(0) & & & 0 \\ & X_n(1) & & \\ & & \ddots & \\ 0 & & & X_n(K-1) \end{bmatrix}$$

where
K is an observation window size in the frequency domain.
$Y_n^K$ is the N×K received matrix over K sub-carriers at time nT.
$X_n^K$ is the MK×K transmit matrix over K subcarriers at time nT.

For an observation window of size L, the receive sample vector from nT to (n+L−1)T may be expressed as $$Y_L = [Y_n^K, Y_{n+1}^K, \ldots, Y_{n+L-1}^K],$$

$$H_L = [H_n^K, H_{n+1}^K, \ldots, H_{n+L-1}^K],$$

$$X_L = \begin{bmatrix} X_n^K & & & 0 \\ & X_{n+1}^K & & \\ & & \ddots & \\ 0 & & & X_{n+L-1}^K \end{bmatrix}$$

Figure 4:
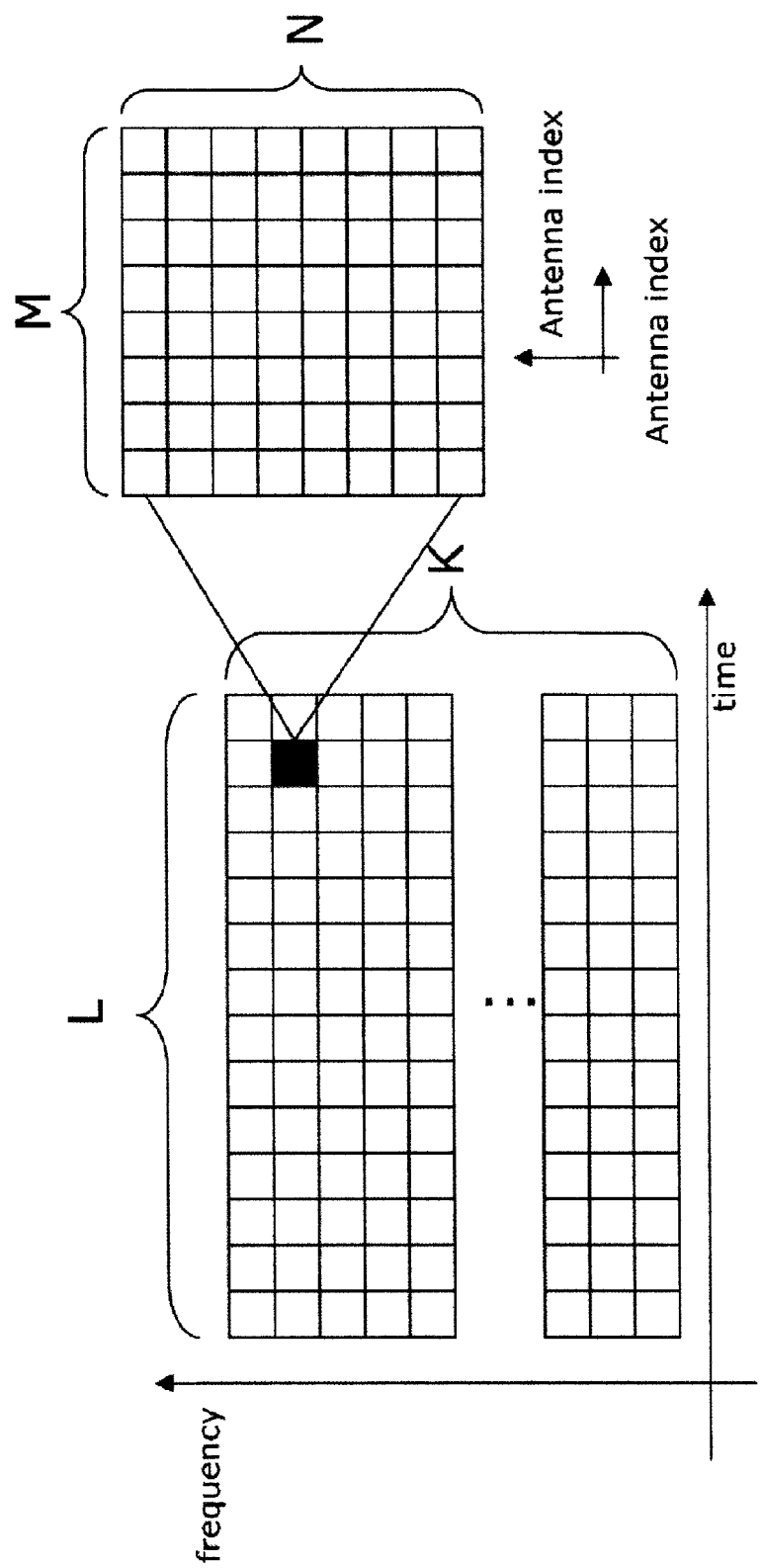
FIG. 4 shows a diagram illustration the required channel coefficients for a MIMO system in frequency, time and spatial domain, consistent with certain disclosed embodiments.

According to the above disclosed model, FIG. 4 shows a diagram illustration the required channel coefficients for a MIMO system in frequency, time and spatial domain, consistent with certain disclosed embodiments. Wherein, the resource of the MIMO system consists of k sub-carriers and L time slots. Therefore, dimension in frequency domain is denoted by K, dimension in time domain is denoted by L, and dimensions in spatial domain are denoted by M and N with the linear arrays of M transmit and N receive antennas. The spatial, time and frequency domain channel correlation may be applied the orthogonal transform by the unitary matrices.

$$vec(H_L) \approx [Q_{L,K_L} \otimes Q_{F,K_F} \otimes \tilde{Q}_{T,K_T} \otimes Q_{R,K_R}]C_{coef}$$

$$\tilde{Q}_{T,K_T}^T = Q_{T,K_T}^T W$$

$$W = \begin{bmatrix} w_1 & & & 0 \\ & w_2 & & \\ & & \ddots & \\ 0 & & & w_M \end{bmatrix}$$

where
$Q_{L,K_L}$ is a L×$K_L$ basis matrix for describing channel behavior in a time domain.
$Q_{F,K_F}$ is a F×$K_F$ basis matrix for describing channel behavior in a frequency domain.
$Q_{T,K_T}$ is a M×$K_T$ basis matrix for describing spatial channel correlation among a transmit antenna array.
$Q_{R,K_R}$ is a N×$K_R$ basis matrix for describing spatial channel correlation among a receive antenna array.
$C_{coef}$ is a $K_L K_F K_T K_R$×1 coefficient vector, which contains coefficients of above bases.
$\tilde{Q}_{T,K_T}$ is a M×$K_T$ matrix, contains both a transmit basis and the AoD information.
W is a M×M diagonal matrix, which contains the AoD information.
$w_i$ is an 1×1 unit modulus entry, represents AoD information.
$\otimes$ is the Kronecker product operation.
vec( ) is the vectorization operation.

Note that $K_L$, $K_F$, $K_T$, $K_R$ are known model orders, and matrix $\tilde{Q}_{T,K_T}$ is decomposed into a new unitary matrix $\tilde{Q}_{T,K_T}$ and a diagonal matrix W with unit modulus entries. The exemplary embodiments substitute the basis matrices $Q_{L,K_L}$, $Q_{T,K_T}$, $Q_{R,K_R}$ with $K_L(\leq L)$, $K_T(\leq M)$ and $K_R(\leq N)$ for unitary matrices $Q_L$, $Q_T$, and $Q_R$, in order to find the more compact channel coefficients for the channel estimates. In other words, the exemplary embodiments derive a reduced-rank channel model to find the more compact channel coefficients for the channel estimates.

Figure 5:
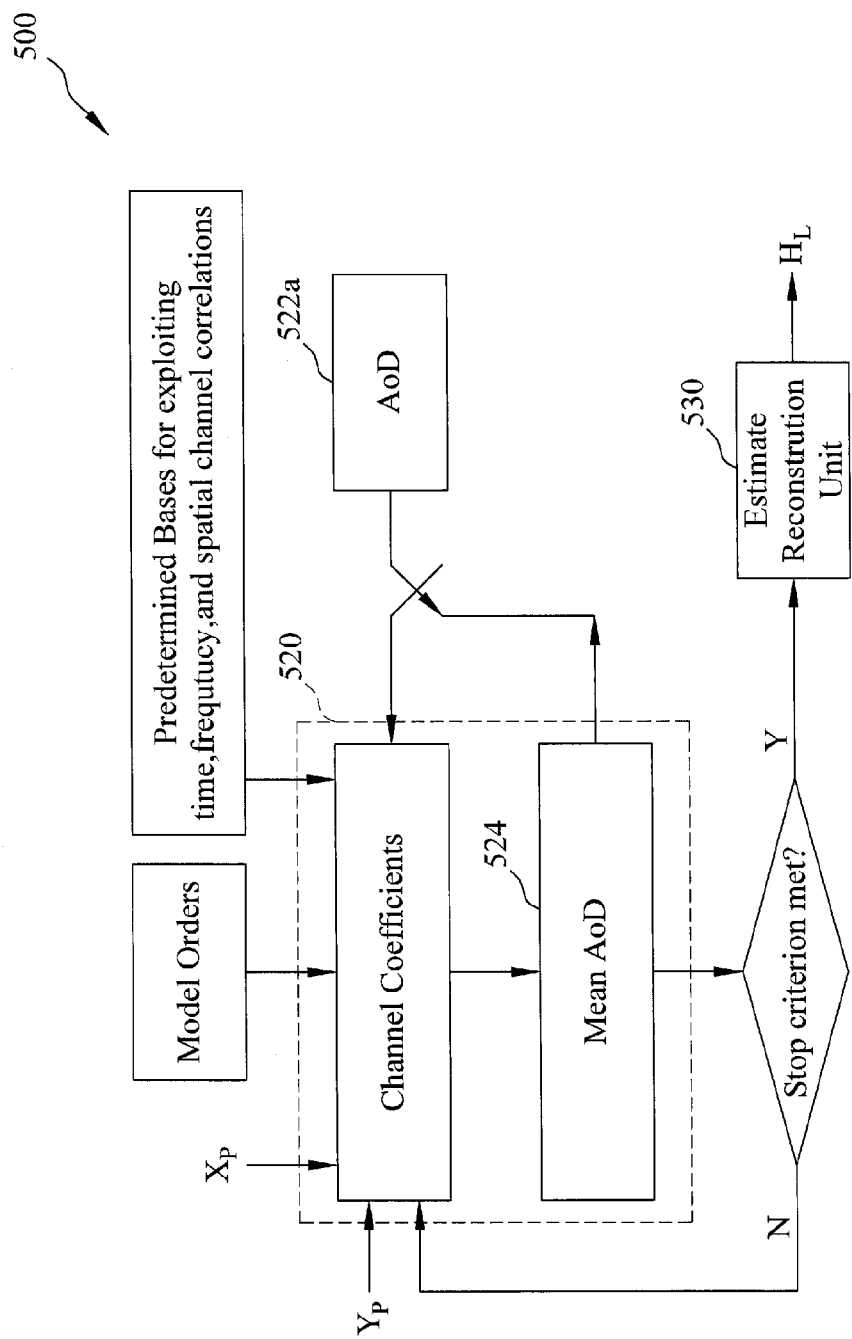
FIG. 5 shows an exemplary schematic view of a model-based channel estimator for correlated fading channels, consistent with certain disclosed embodiments.

In other words, wireless channel may be modeled by steering vectors as the above formula. With proper model order known, the exemplary embodiments may further express the corresponding optimal channel estimate (by a least square method) in terms of $W_{FL}^{optimum}$ and $C_{coef}^{optimum}$, and derive an iterative method for obtaining the channel estimate, where assume that the optimal directional matrix $W_{FL}^{optimum}$ and the optimal coefficient vector $C_{coef}^{optimum}$ is available when the least square method is applied for estimating the AoD information and directional information, respectively. FIG. 5 shows an exemplary schematic view of a model-based channel estimator for correlated fading channels, consistent with certain disclosed embodiments. Referring to FIG. 5, the model-based channel estimator 500 may comprise an estimator of channel parameters 520, and an estimate reconstruction unit 530.

In order to derive a MIMO channel, bases for exploiting time, frequency, and spatial channel correlations are predetermined. For example, a basis matrix $Q_{L,K_L}$ for describing time domain channel behavior, a basis matrix $Q_{F,K_F}$ for describing frequency domain channel behavior, a basis matrix $Q_{T,K_T}$ for describing transmit spatial correlation, and a basis matrix $Q_{R,K_R}$ for describing receive spatial correlation are predetermined. The estimator of channel parameters 520 estimates channel coefficients 522 of a channel matrix for a given AoD 522a, with received signal Yp, transmit pilot Xp, known model orders $K_L$, $K_F$, $K_T$, $K_R$, and predetermined bases $Q_{L,K_L}$, $Q_{F,K_F}$, $Q_{T,K_T}$, and $Q_{R,K_R}$, then estimates a mean AoD 524 based on the estimated channel matrix. The estimator of channel parameters 520 iterates the estimations for channel coefficients 522 and the mean AoD 524 until a stop criterion is met. The estimate reconstruction unit 530 reconstructs a channel estimate H by using $Q_{L,K_L}$, $Q_{F,K_F}$, $\tilde{Q}_{T,K_T}$, $Q_{R,K_R}$, and a final estimate of channel coefficients 522. Base matrices $Q_{L,K_L}$, $Q_{F,K_F}$, $Q_{T,K_T}$, and $Q_{R,K_R}$ may be computed by offline.

Figure 6:
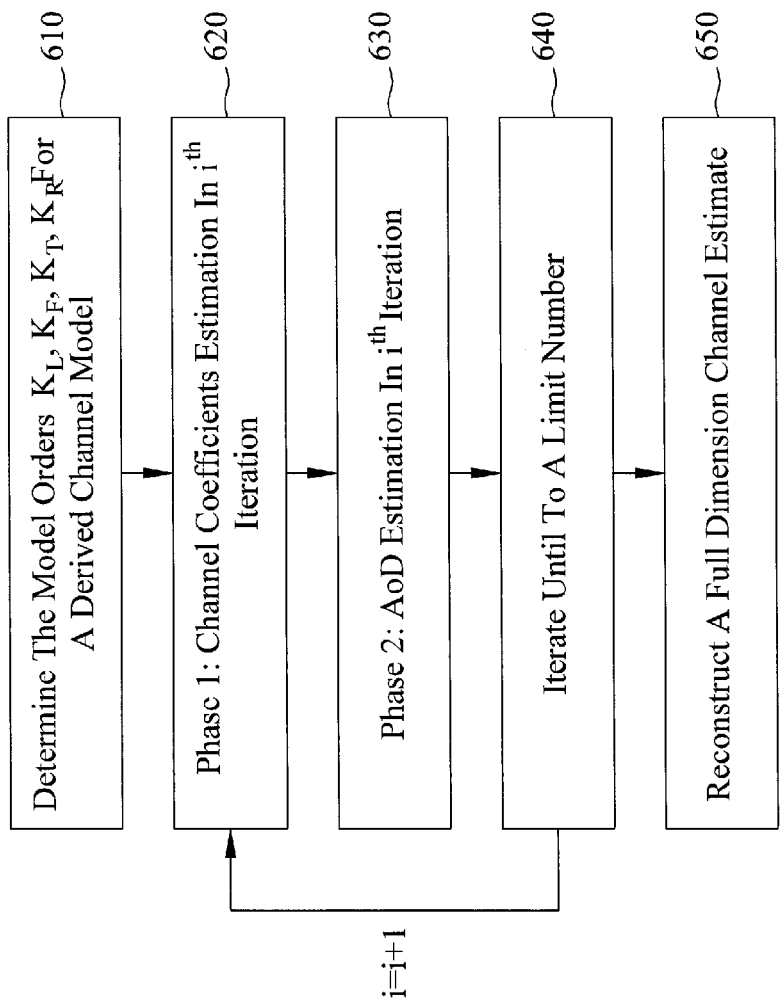
FIG. 6 is a flow chart of an exemplary embodiment illustrating a method of model-based channel estimation for correlated fading channels, consistent with certain disclosed embodiments.

An iterative method is also disclosed herein, wherein the channel estimation is carried out in the model-based channel estimator of FIG. 5. In each iterative process, the method may include two phases referred to channel coefficient estimation and AoD estimation, respectively. The iterative method stops iterations when it satisfies a criterion. For example, the stop criterion may be defined as a maximum iteration number or a minimum difference update. FIG. 6 is a flow chart of an exemplary embodiment illustrating a method of model-based channel estimation for correlated fading channels, consistent with certain disclosed embodiments.

Note that, the fourth state (step 640, i.e. iterate until to a limit number) will go back to the second state for performing phase 1 (step 620, i.e. channel coefficients estimation in $i^{th}$ iteration) and third state for performing phase 2 (step 630, i.e. AoD estimation in $i^{th}$ iteration) until satisfying a given threshold such as a maximum iterative number or a minimum difference update. The method flows as follows. First, determine the model orders $K_L$, $K_F$, $K_T$, $K_R$ for a derived channel model (step 610) by some existing algorithm such as a rank estimation algorithm or a model order estimation algorithm. This state may be implemented by offline. For example, the step may be implemented by some fixed model orders if the performance loss due to the model order mismatch can be acceptable. Next, starting the first iteration, i.e. i=1, for performing step 620 then step 630. Then, go to the fourth state to iterate i, i.e. i=i+1, until the iteration i reaches to a limit number. The final state is to reconstruct a full dimension channel estimate (step 650) for the post-processing operation. The channel estimate $H_L$ may be reconstructed by a steering vector as $$\operatorname{vec}(H_L) \approx [Q_{L,K_L} \otimes Q_{F,K_F} \otimes \tilde{Q}_{T,K_T} \otimes Q_{R,K_R}] C_{coef}$$

The model-based channel estimator and the channel estimation method offer the advantage of rendering both the channel coefficients estimation and the AoD estimation simultaneously. This will become better understood after the following detailed description of the phase 1 and the phase 2.

Phase 1—Channel Coefficient Estimation

Assume that the directional matrix is optimum, i.e. $\hat{W}_{FL}^{[i-1]} = W_{FL}^{optimum}$, therefore the Lease Square (LS) estimate of channel coefficients would be $$\hat{C}_{coef}^{[i]} = \left\{ \left[ \left( \hat{W}_{FL}^{[i-1]} X_L \right)^T (Q_{L,K_L} \otimes Q_{F,K_F} \otimes Q_{T,K_T}) \right]^\dagger \otimes Q_{R,K_R}^\ddagger \right\} \operatorname{vec}(Y_L)$$

$$\hat{W}_{FL}^{[i-1]} = I_{FL} \otimes \hat{W}^{[i-1]}$$

$$I_{FL} = \begin{bmatrix} 1 & & 0 \\ & \ddots & \\ 0 & & 1 \end{bmatrix}_{FL \times FL}$$

Where $\{\ \}^\dagger$ denotes the pseudo-inverse operation.
$\hat{W}_{FL}^{[i-1]}$ is a FLM×FLM matrix, contains the AOD information W.
$\hat{W}^{[i-1]}$ is a M×M matrix, denotes the estimation of the W at the (i−1)th iterative process.
$\hat{C}_{coef}^{[i]}$ is a $K_L K_F K_T K_R \times 1$ vector, denotes the estimation of $C_{coef}$ at the i-th iterative process, which is a function of the matrix $W_{FL}^{optimum}$. At the i-th iteration, since the optimal directional matrix $W_{FL}^{optimum}$ is not available, the tentative estimation $\hat{W}_{FL}^{[i-1]}$ replaces $W_{FL}^{optimum}$.

Phase 2—AoD Estimation (Direction Estimation)

Similar to Phase I, assume that the optimal coefficient vector is available, i.e., $\hat{C}_{coef}^{[i-1]} = C_{coef}^{optimum}$, when estimating the directional information. Then define a new matrix, $G^{[i]}$ as $$G^{[i]} \triangleq Q_{R,K_R} \overline{C}_{coef}^{[i-1]} (Q_{L,K_L} \otimes Q_{F,K_F} \otimes Q_{T,K_T})^T$$

where $\overline{C}_{coef}^{[i-1]}$ is a $K_R \times K_L K_F K_T$ matrix derived by $$\overline{C}^{[i-1]}(i,j) = \hat{C}_{coef}^{[i-1]}(K_R(j-1)+i)$$

where $1 \leq i \leq K_R$, $1 \leq j \leq K_L K_T K_F$.
Notes that C(i,j) means the i-th, j-th entry of the matrix C, and $\overline{C}_{coef}^{[i-1]}$ is the arrangement of the $\hat{C}_{coef}^{[i-1]}$ from $K_R K_L K_F K_T \times 1$ to $K_R \times K_L K_F K_T$.

Define a matrix $T^{[i]}$ as following.

$$T^{[i]} \triangleq [(1_{F \times L} \otimes G^{[i]}) \odot (X_L^T \otimes 1_{N \times 1})](1_{F \times L} \otimes I_M)$$

where $\odot$ represents the operation of the Hadamard product.
$1_{F \times L}$ is an all-one matrix, i.e.

$$1_{F \times L} = \begin{bmatrix} 1 & \cdots & 1 \\ \vdots & \ddots & \vdots \\ 1 & \cdots & 1 \end{bmatrix}_{F \times L} \text{ and } 1_{N \times 1} = \begin{bmatrix} 1 \\ \vdots \\ 1 \end{bmatrix}_{N \times 1}$$

$I_M$ is an unite matrix, i.e.

$$I_M = \begin{bmatrix} 1 & & 0 \\ & \ddots & \\ 0 & & 1 \end{bmatrix}_{M \times M}.$$

Then the phase estimate is given by a root-finding problem as following.

$$\hat{Z}^{[i]} = \arg\min_Z \|Z\| - 1|$$

$$\text{s.t. } P(Z) = L\left(T^{[i]H} \operatorname{vec}(Y_L)\right)^H Z - M = 0$$

Where

Z is a M-by-one vector with only one unknown variable z, such that $Z = [1, z, z^2, \ldots, z^{M-1}]$.
$\hat{Z}^{[i]}$ is the estimation result at the i-th iteration, i.e. $\hat{Z}^{[i]} = [1, \hat{z}^{[i]}, \hat{z}^{[i]^2}, \ldots, \hat{z}^{[i]^{M-1}}]$.
$\{\ \}^H$ is the Hermitian transpose operation.

R denotes the phase extraction defined by $$R(a_0 e^{jb_0}, a_1 e^{jb_1}, \ldots, a_K e^{jb_K}) \triangleq [1, e^{j(b_1-b_0)}, \ldots, e^{j(b_K-b_0)}]$$
$$\text{for } a_{i_{i=0}}^{K} \in R^{K+1} \text{ and } b_{i_{i=0}}^{K} \in [0, 2\pi).$$

The minimum problem is achieved by solving P(Z)=0 to get M−1 roots, then find the best one from M−1 roots which minimizes the cost function, i.e. ||Z|−1|. The directional matrix $\hat{W}^{[i]}$ at the i-th iterative process may be constructed by $$\hat{W}^{[i]} = \begin{bmatrix} 1 & & & 0 \\ & \hat{z}^{[i]} & & \\ & & \ddots & \\ 0 & & & \hat{z}^{[i]M-1} \end{bmatrix}$$

where $\hat{z}^{[i]}$ is the estimate of z at the i-th iterative process, an element of $\hat{Z}^{[i]}$. In other words, search for the root of the correlation polynomial P(Z)=0 which is the closest to the unit circle, and then retrieving the AoD information from $\hat{z}^{[i]}$. The directional matrix is to be reconstructed by a unity matrix $I_L$ multiplying the diagonal matrix of the estimate of z. In other words, the AoD information may be extracted by a direction estimate through a phase extraction R, and finding an optimal phase estimate may be given by a root-finding problem.

At each iterative process, both channel coefficients estimation and AoD extraction are performed. In other words, the disclosed channel estimator or channel estimation method provides a single-block based least square estimate of channel coefficients by taking the spatial, time and frequency correlations into account, and offers the advantage of rendering both channel coefficients and mean AoD simultaneously. As described in step 640 of FIG. 6, it may stop the iterations when it satisfies the criterion. The stop criterion may be defined as a maximum iteration number or a minimum difference update, for example, if i≤5 then stop, else increase i by one, i.e. i=i+1, to continue the phase 1 and phase 2.

For a system model with comb-type pilot, all the setting is almost the same, but with fewer pilots. In the frequency domain, transmit and receive matrices are shown as follows.

$$Y_n^\varphi = [Y_n(k_1), Y_n(k_2), \ldots, Y_n(k_\varphi)]$$

$$X_n^\varphi = \begin{bmatrix} X_n(k_1) & & & 0 \\ & X_n(k_2) & & \\ & & \ddots & \\ 0 & & & X_n(k_\varphi) \end{bmatrix}$$

where $k_i \in S_K$ denotes the pilot index in the frequency, for example, $S_K=[1, 2, 6, 7, \ldots, 126, 127]$, then $k_2=2$, and $k_3=6$. $\varphi$ is the total number of the transmit pilots in the frequency domain. Similarly, in the time domain, $$Y_\psi = [Y_{n_1}^\varphi, Y_{n_2}^\varphi, \ldots, Y_{n_\psi}^\varphi]$$

$$H_\psi = [H_{n_1}^\varphi, H_{n_2}^\varphi, \ldots, H_{n_\psi}^\varphi]$$

$$X_\psi = \begin{bmatrix} X_{n_1}^\varphi & & & 0 \\ & X_{n_2}^\varphi & & \\ & & \ddots & \\ 0 & & & X_{n_\psi}^\varphi \end{bmatrix}$$

where $n_i \in S_N$ denotes the pilot index in time domain, for example, $S_N=[6, 7, 13, 14]$. ψ is the total number of the transmit pilots in the time domain, for example, ψ=4.

For the system model with comb-type pilot, the bases are also reduced to a proper size. The exemplary embodiment only use the i-th rows of matrix which is on the list of pilot index, for example, the time domain and the frequency domain bases would be reduced as follows.

$$\overline{Q}_{L,K_L} = \begin{bmatrix} q_{L,n_1} \\ q_{L,n_2} \\ \vdots \\ q_{L,n_\psi} \end{bmatrix}, \text{ and } \overline{Q}_{F,K_F} = \begin{bmatrix} q_{F,k_1} \\ q_{F,k_2} \\ \vdots \\ q_{F,k_\varphi} \end{bmatrix}$$

$q_{L,n_i}$ is an 1×$K_L$ vector, the $n_i$-th row vector of the time domain basis matrix $Q_{L,K_L}$, i.e. $Q_{L,K_L}=[q_{L,1}=q_{L,2}=\cdots=q_{L,L}]^T$ and $\overline{Q}_{L,K_L}$ is a smaller set of it. $q_{F,k_i}$ is an 1×$K_F$ vector, the $k_i$-th row vector of the frequency domain basis matrix $Q_{F,K_F}$, i.e. $Q_{F,K_F}=[q_{F,1}=q_{F,2}=\cdots=q_{F,K}]^T$ and $\overline{Q}_{F,K_F}$ is a smaller set of it. Since that we have full pilots on the spatial domain, the bases for transmit and received antennas are still the same as continue-type pilot case.

In analyzing the mean square error (MSE) performance, exemplary simulation results described here use the root-finding scheme for an 8×8 MIMO-OFDM system with FFT-size k=128 and AS=2°. The channel model is based on the 3GPP spatial channel model (SCM) which generates the channel coefficients according to a set of selected parameters such as AoD, angle of arrival (AoA), etc. It is a parametric stochastic model whose spatial cross correlations are functions of joint distribution of the AoD at the transmit side and the AoA at the receive side.

Figure 7:
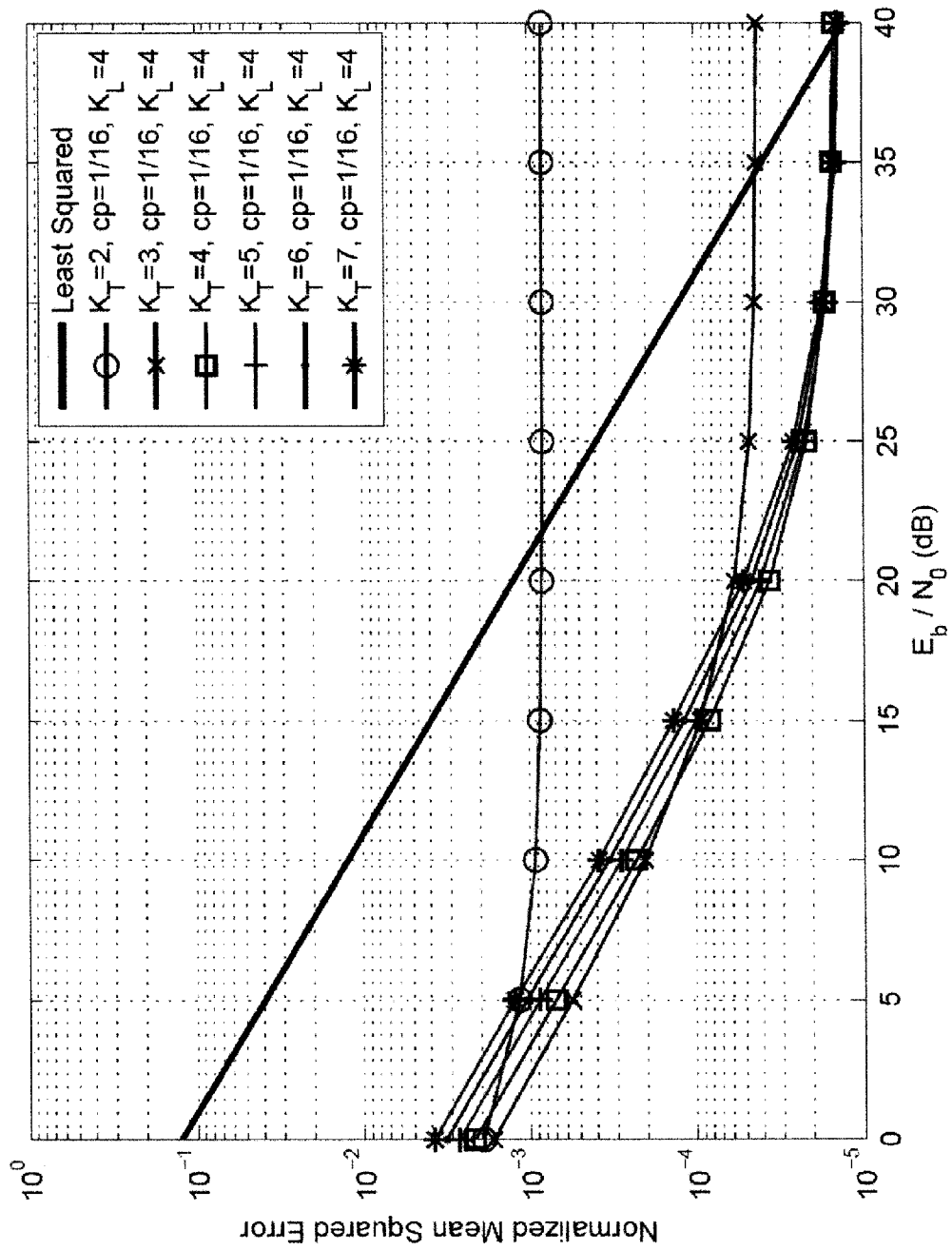
FIG. 7 shows the effect of the model order $K_T$ on the MSE performance of the root-finding scheme in a SCM channel, consistent with certain disclosed embodiments.
Figure 8:
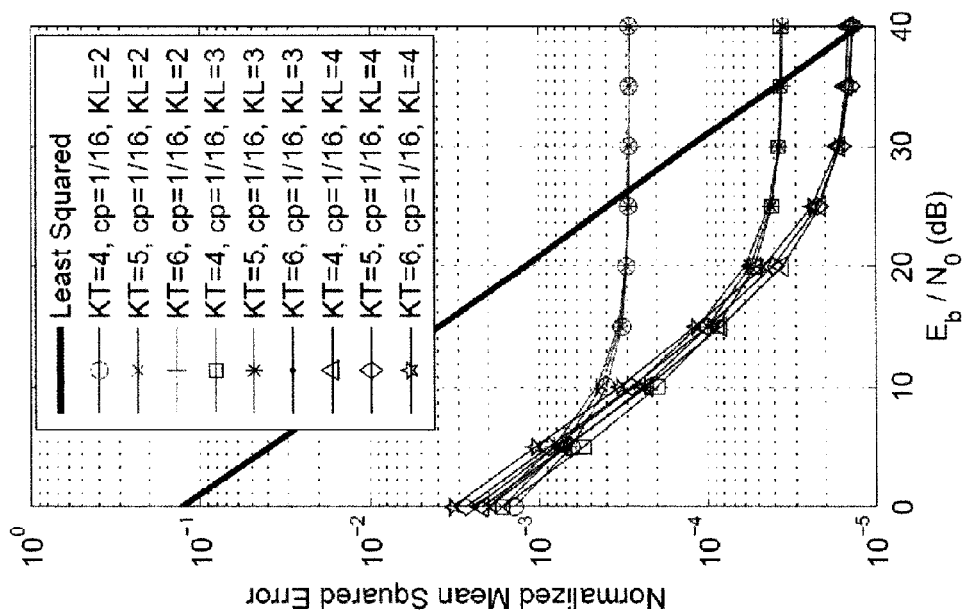
FIG. 8 shows the effect of the model orders $K_T$ and $K_L$ on the MSE performance of the root-finding scheme in a SCM channel, consistent with certain disclosed embodiments.

Assume that the environment surrounding mobile station is rich scattering with negligible spatial correlations. Hence, a full rank basis matrix is used to characterize the spatial correlation at the receive side. Other assumptions and conditions used in the simulation are (1) the antenna spacing at transmit and receive arrays are same, (2) an orthogonal training matrix is used, (3) 10 iterations are used for the simulation, (4) Eb/No is defined as the average signal to noise power ratio (SNR) at the input of each receive antenna, and (5) orthogonal polynomial basis matrices are used for unitary matrices $Q_L$, $Q_T$, and $Q_R$. All algorithms compute frequency domain channel response by substituting the final result of phase 1 (i.e. estimated coefficient matrix) and that of phase 2 into channel estimate $H_L$ as mentioned above. The channel is a block fading with an approximated rank of two. Since the base station (BS) spatial correlations are high, the corresponding correlation function lies in a low-dimension subspace so that a small $K_T$ is sufficient to describe the channel. FIG. 7 shows the effect of the model order $K_T$ on the MSE performance of the root-finding scheme in a SCM channel, consistent with certain disclosed embodiments. FIG. 8 shows the effect of the model orders $K_T$ and $K_L$ on the MSE performance of the root-finding scheme in a SCM channel, consistent with certain disclosed embodiments.

In FIG. 7, considering a time correlated fading environment and using an observation window L=7, the processing dimension may be drastically reduced provided that either the spatial or time domain correlation is high enough. Performance degradation occurs when the model order is not large enough to capture the channel characteristic. As can be seen from FIG. 7, an optimal $K_T$ exists for any given SNR. Increasing the model order $K_T$ does not necessary improve the performance. As expected, the modeling errors dominate the MSE performance when SNR is high.

In FIG. 8, the processing dimension $K_L$ may be drastically reduced when the time domain correlation is high enough. Besides, if considering a certain level of an acceptable MSE, for example, $(10^{-3}, 10^{-4})$, the disclosed exemplary embodiments of the model-based channel estimator and method may reduce the processing dimensions $K_T$, $K_L$, and D further to maintain a reasonable bit error ratio (BER) performance, where D is the number of paths between a base station antenna and a mobile station antenna for a discrete-time MIMO channel impulse response. For example, in case of $K_T=4$, $K_L=2$ and CP ratio=1/16, the MSE performance is under $10^{-3}$, and the compression rate is $(4/8)\times(2/7)\times(1/16)=0.0089$, which means only 1% coefficients are needed to well represent the channel response. In other words, even with as high as a compression ratio of 1%, the disclosed exemplary embodiments of the model-based channel estimator is capable of maintaining an acceptable MSE in highly correlated environments.

Figure 9:
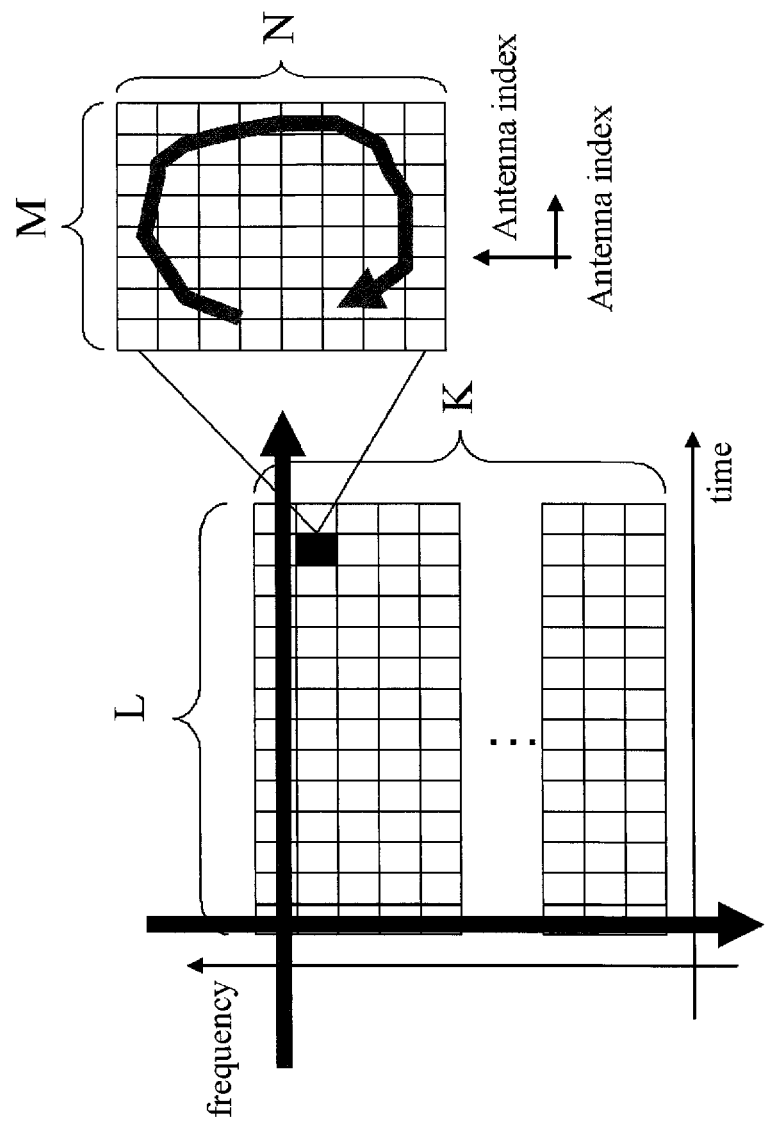
FIG. 9 shows an exemplary application with feedback model coefficients of the disclosed model-based channel estimator, consistent with certain disclosed embodiments.

The reduced-rank channel model of the disclosed exemplary embodiments is useful for pre- or post-channel-estimation applications, such as CSI feedback, precoder design and user/channel selection. FIG. 9 shows an exemplary application with feedback model coefficients of the disclosed model-based channel estimator, consistent with certain disclosed embodiments. In this exemplary application, feedback model coefficients are obtained by exploiting the time, frequency, and spatial correlations of the channel. The dimensions in time, frequency, and spatial domain for obtained feedback model coefficients for a MIMO system are denoted by L, K, M and N, respectively. Compared with the LTE codebook-based mechanism, the feedback model coefficients of FIG. 9 are more compact channel coefficients. For example, for the feedback model coefficients of FIG. 9, L×K×M×N may be 4×1×2×8. While for the channel coefficients of the LTE codebook-based mechanism, L×K×M×N will be 12×14×8×8. With the disclosed model-based channel estimator, different precoding matrices may be provided for different times and subcarriers for a resource block in a MIMO system, instead of one resource block with the same precoding matrix.

Figure 10:
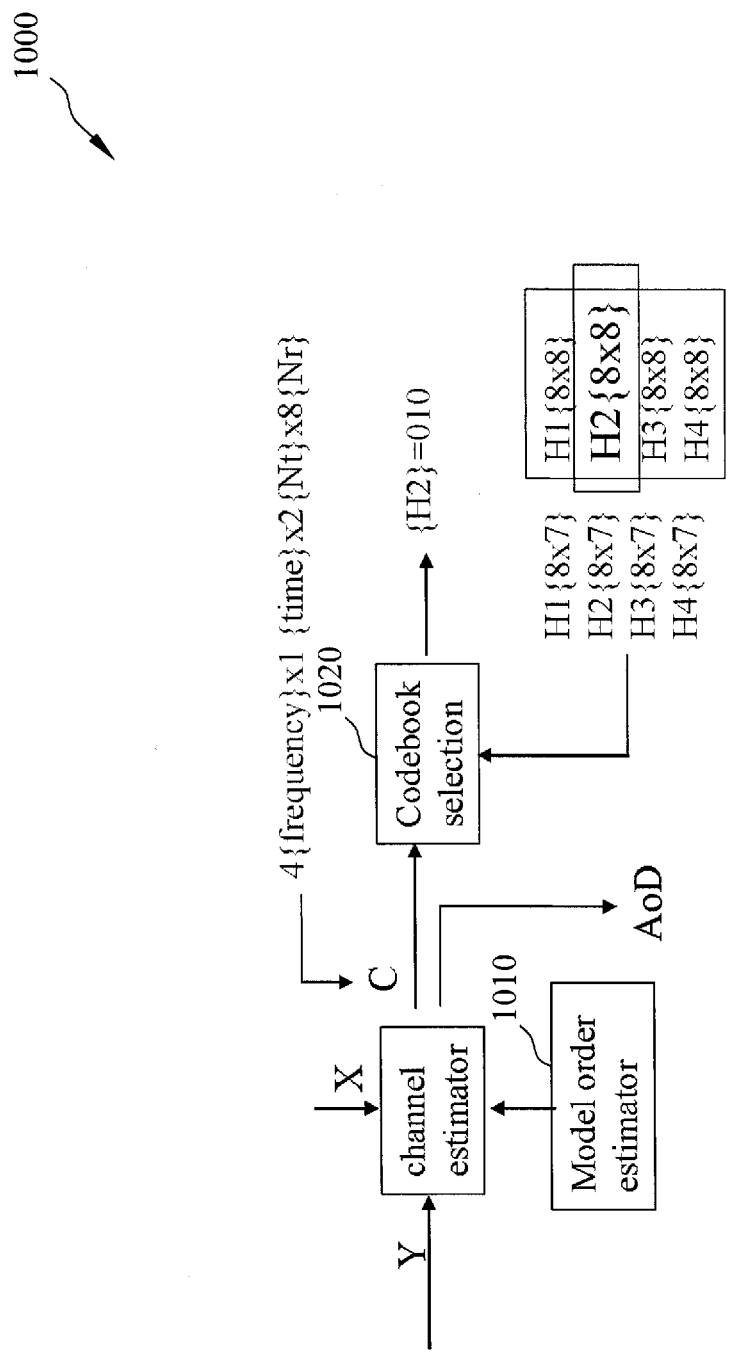
FIG. 10 shows an exemplary post-channel-estimation application at receive end with the disclosed model-based channel estimator, consistent with certain disclosed embodiments.

For post-channel-estimation applications such as at receive end or codebook selector, the disclosed model-based channel estimator may reduce search complexity due to having the spatial base, and increase the selecting accuracy for the codebook due to taking the correlation between time domain and frequency domain into account. FIG. 10 shows an exemplary post-channel-estimation application at receive end with the disclosed model-based channel estimator, consistent with certain disclosed embodiments. Referring to FIG. 10, both the 4×1×2×8 feedback model coefficients and AoD information are generated by the disclosed model-based channel estimator 500, wherein a model order estimator 1010 may provide model orders $K_L=K_F=K_T=K_R$ to the channel estimator 500. The 4 {frequency}×1{time}×2{transmit spatial}×8 {receive spatial} feedback model coefficients are further used for codebook selection 1020. Similarly, for a resource block, different precoding matrices are provided for different times and subcarriers at receive end 1000, instead of one resource block with the same precoding matrix.

Figure 11:
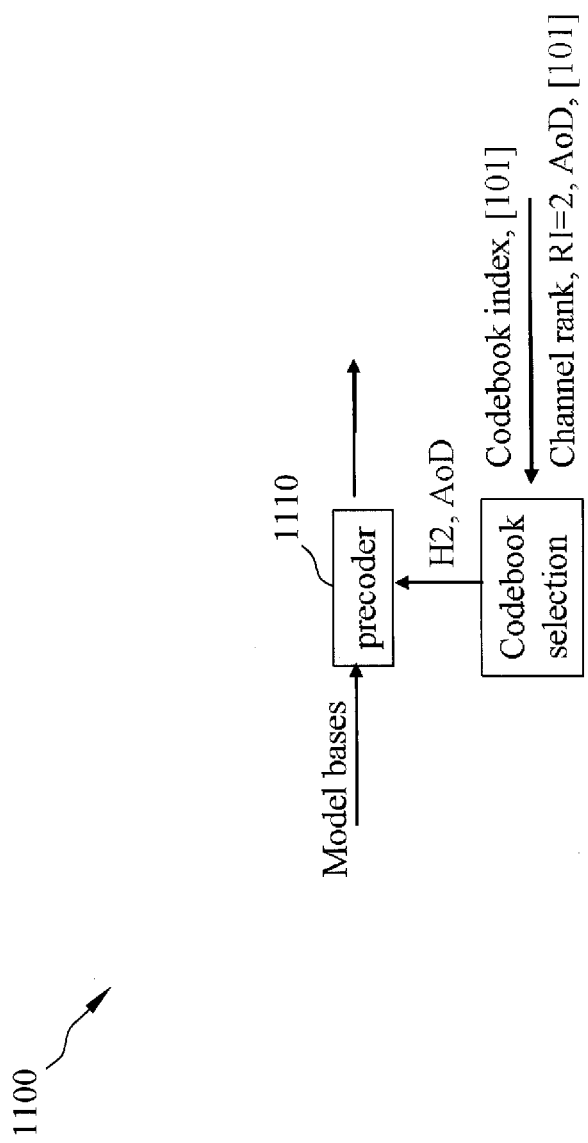
FIG. 11 shows an exemplary pre-channel-estimation application at transmit end with the disclosed model-based channel estimator, consistent with certain disclosed embodiments.

For pre-channel-estimation applications such as at transmit end or precoder, the disclosed model-based channel estimator may reduce required upper link transmissions due to having the spatial base, and provide information of antenna's emission angle at transmit end. FIG. 11 shows an exemplary pre-channel-estimation application at transmit end with the disclosed model-based channel estimator, consistent with certain disclosed embodiments. Referring to FIG. 11, at transmit end 1100, now information of spatial, time and frequency are available. Therefore, the model-based channel estimator may provide time, frequency, and spatial bases to precoder 1110. In addition, AoD information generated by the model-based channel estimator, codebook index and channel rank are further used for codebook selection. With the computation result from codebook selection and model bases provided by the model-based channel estimator, different precoding matrices are provided for different times and subcarriers at transmit end 1100, instead of one resource block with the same precoding matrix.

Figure 12:
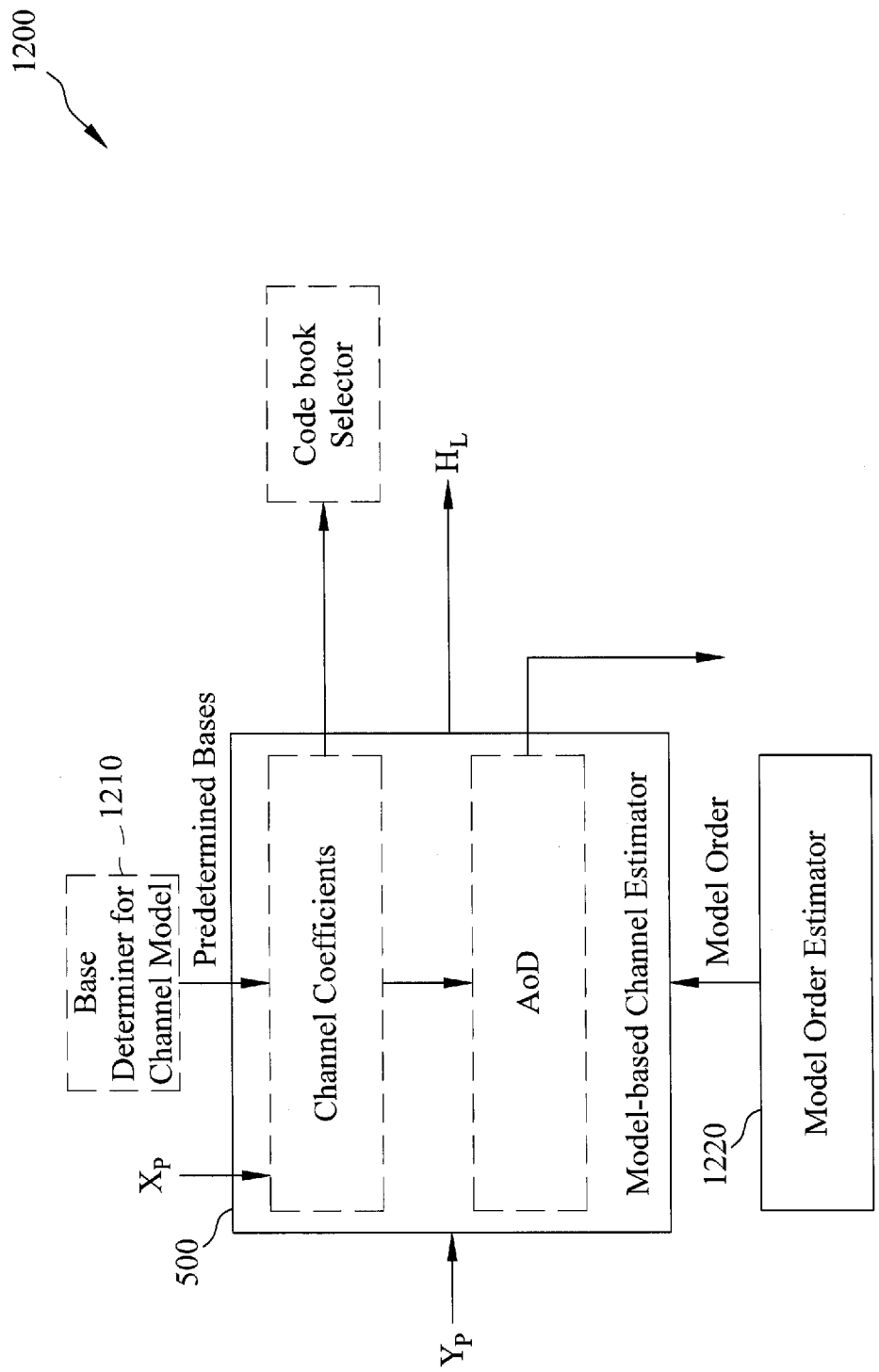
FIG. 12 shows an exemplary schematic view illustrating a receiver end, consistent with certain disclosed embodiments.

FIG. 12 shows an exemplary schematic view illustrating a receiver end, consistent with certain disclosed embodiments. The receiver end 1200 having a codebook selector may comprise model-based channel estimator 500, and a model order estimator 1220. The model order estimator 1220 estimates model orders $K_L$, $K_F$, $K_T$, $K_R$ for basis matrices $Q_{L,K_L}$, $Q_{F,K_F}$, $Q_{T,K_T}$ and $Q_{R,K_R}$, respectively. The operation and functionality of model-based channel estimator 500 have been described in FIG. 5. As mentioned before, model-based channel estimator 500 estimates channel coefficients $C_{coef}$ of a channel matrix for a given AoD by using a plurality of received signals Yp, a plurality of transmit pilots Xp, estimated model orders $K_L$, $K_F$, $K_T$, $K_R$, and bases $Q_{L,K_L}$, $Q_{F,K_F}$, $Q_{T,K_T}$ and $Q_{R,K_R}$ for exploiting time, frequency and spatial channel correlations, then estimates a mean AoD based on the estimated channel matrix. And model-based channel estimator 500 iterates the channel coefficients estimate and the mean AoD estimate until a stop criterion is met. As mentioned before, When the stop criterion is met, it reconstructs a channel estimate H by using $Q_{L,K_L}$, $Q_{F,K_F}$, $\tilde{Q}_{T,K_T}$ and $Q_{R,K_R}$, and $C_{coef}$, where $\tilde{Q}_{T,K_T}$ contains both transmit basis $Q_{T,K_T}$ and the AoD information. Similarly, for a resource block, different precoding matrices are provided for different times and subcarriers at receive end 1200, instead of one resource block with the same precoding matrix. The receiver end 1200 may further include a base determiner for channel model 1210 to predetermine the plurality of base matrices $Q_{L,K_L}$, $Q_{F,K_F}$, $Q_{T,K_T}$, and $Q_{R,K_R}$.

Therefore, by exploiting the time, frequency, and spatial channel correlations, the disclosed exemplary embodiments provide a general reduced-rank channel model and a corresponding low-complexity estimation scheme for wideband spatial-correlated MIMO systems. The disclosed exemplary embodiments also provide a single-block based iterative least squares channel estimator that takes the frequency-correlation and time-correlation into account. The disclosed model-based channel estimator and method may further generate the time, frequency, and spatial bases, and the antenna's emission angle at transmit end. Besides the channel estimation, an exemplary receiver end is provided by further including a base determiner and a model order estimator. The base determiner and the model order estimator are used to construct the system and channel model for the channel estimation, which may be constructed by offline.

Although the disclosure has been described with reference to the exemplary embodiments. It will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A model-based channel estimator for correlated fading channels adapted to a multiple-input multiple-output (MIMO) system having a transmit antenna array and a receive antenna array, said channel estimator comprising:

an estimator of channel parameters that estimates a coefficient vector of a channel matrix for a given angle of departure (AoD) according to a plurality of received signals, a plurality of transmit pilots, a plurality of known model orders for a derived channel model, and a plurality of predetermined bases for exploiting time channel correlation, frequency channel correlation, spatial channel correlation among said transmit antenna array, and spatial channel correlation among said receive antenna array, then estimates a mean AoD based on the estimated channel matrix, wherein, said estimator of channel parameters estimates iteratively said coefficient vector and said mean AoD until a stop criterion is met; and an estimate reconstruction unit that reconstructs a channel estimate, by using said plurality of predetermined bases, said coefficient vector, and the mean AoD.

2. The channel estimator as claimed in claim 1, wherein said plurality of predetermined bases at least include a basis matrix for describing channel behavior in a time domain, a basis matrix for describing channel behavior in a frequency domain, a basis matrix for describing spatial channel correlation among said transmit antenna array, and a basis matrix for describing spatial channel correlation among said receive antenna array.

3. The channel estimator as claimed in claim 1, wherein said channel estimator computes said plurality of predetermined bases by offline.

4. The channel estimator as claimed in claim 1, wherein said channel estimate is reconstructed by a steering vector through a vectorization operation and a Kronecker product operation.

5. The channel estimator as claimed in claim 1, wherein said stop criterion is defined as a maximum iteration number or a minimum difference update.

6. The channel estimator as claimed in claim 1, wherein said channel estimator is a single-block based least square estimate of channel coefficients.

7. The channel estimator as claimed in claim 1, wherein said derived channel model is a reduced-rank channel model for a plurality of spatial-correlated block-faded MIMO channels.

8. The channel estimator as claimed in claim 1, wherein said model-based channel estimator provides different precoding matrices at different times and a plurality of subcarriers for a resource block of said MIMO system.

9. A model-based channel estimation method for correlated fading channels adapted to a multiple-input multiple-output (MIMO) system having a transmit antenna array and a receive antenna array, said method comprising:

using a model order estimator to determine a plurality of model orders denoted by $K_L$, $K_F$, $K_T$, $K_R$, for a derived channel model by an estimation algorithm;

using a channel parameter estimator to perform an estimation for a coefficient vector $C_{coef}$ of a channel matrix and an estimation for an angle of departure (AoD) according to a plurality of signals received in said receive antenna array of said MIMO system by using an iterative scheme, and stopping iterations when a criterion is satisfied; and using an estimate reconstruction unit to reconstruct a full dimension channel estimate $H_L$ by using the estimated channel coefficient vector $C_{coef}$, a plurality of predetermined basis matrices denoted by $Q_{L,K_L}$, $Q_{F,K_F}$, $Q_{R,K_R}$, and $\tilde{Q}_{T,K_T}$ containing both basis matrix $Q_{T,K_T}$ and the AoD;

wherein said derived channel model is derived by predetermining said plurality of basis matrices $Q_{L,K_L}$, $Q_{F,K_F}$, $Q_{T,K_T}$ and $Q_{R,K_R}$ for exploiting time channel correlation, frequency channel correlation, spatial channel correlation among said transmit antenna array, and spatial channel correlation among said receive antenna array, respectively.

10. The channel estimation method as claimed in claim 9, wherein said channel estimate $H_L$ is reconstructed by a steering vector as $$\text{vec}(H_L) \approx [Q_{L,K_L} \otimes Q_{F,K_F} \otimes \tilde{Q}_{T,K_T} \otimes Q_{R,K_R}] C_{coef},$$

where vec( ) is a vectorization operation and $\otimes$ is a Kronecker product operation.

11. The channel estimation method as claimed in claim 9, wherein the estimation for said coefficient vector $C_{coef}$ is an iterative least squares channel estimator.

12. The channel estimation method as claimed in claim 9, wherein said AoD is extracted such that $$\tilde{Q}_{T,K_T}^T = Q_{T,K_T}^T \times W,$$

where W is a diagonal matrix with unit modulus entries.

13. The channel estimation method as claimed in claim 12, wherein said AoD is extracted by a direction estimate through a phase extraction, and finding an optimal phase estimate is given by a root-finding problem.

14. The channel estimation method as claimed in claim 9, wherein the time channel correlation, the frequency channel correlation, the spatial channel correlation among said transmit antenna array, and the spatial channel correlation among said receive antenna array are applied an orthogonal transform by a plurality of unitary matrices.

15. The channel estimation method as claimed in claim 9, wherein said model-based channel estimation method provides different precoding matrices at different times and a plurality of subcarriers for a resource block in said MIMO system.

16. A receiver end having a codebook selector, said receiver end being adapted to a multiple-input multiple-output (MIMO) system having a transmit antenna array and a receive antenna array, and comprising:

a model order estimator that estimates a plurality of model orders;

a model-based channel estimator that estimates a coefficient vector of a channel matrix for a given angle of departure (AoD) according to a plurality of received signals, a plurality of transmit pilots, said plurality of model orders for a derived channel model, and a plurality of predetermined bases for exploiting time channel correlation, frequency channel correlation, spatial channel correlation among said transmit antenna array, and spatial channel correlation among said receive antenna array, then estimates a mean AoD based on the estimated channel matrix, wherein, said estimator of channel parameters estimates iteratively said coefficient vector and said mean AoD until a stop criterion is met, when said stop criterion is met, said model-based channel estimator reconstructs a channel estimate by using said plurality of predetermined bases, said coefficient vector, and the mean AoD.

17. The receiver end as claimed in claim 16, wherein said receiver end further includes a base determiner that predetermines said plurality of bases at least including a basis matrix for describing channel behavior in a time domain, a basis matrix for describing channel behavior in a frequency domain, a basis matrix for describing spatial channel correlation among said transmit antenna array, and a basis matrix for describing spatial channel correlation among said receive antenna array.

18. The receiver end as claimed in claim 16, wherein said model-based channel estimator provides different precoding matrices at different times and a plurality of subcarriers for a resource block in said MIMO system.

* * * * *